United States Patent [19]

Shinojima

[11] Patent Number: 5,333,577
[45] Date of Patent: Aug. 2, 1994

[54] VARIABLE VALVE OPERATION TIMING CONTROL DEVICE

[75] Inventor: Masaaki Shinojima, Kariya, Japan
[73] Assignee: Nippondenso Co., Ltd., Kariya, Japan
[21] Appl. No.: 124,554
[22] Filed: Sep. 22, 1993

[30] Foreign Application Priority Data

Sep. 25, 1992 [JP] Japan .................................. 4-256368
Jul. 26, 1993 [JP] Japan .................................. 5-183686

[51] Int. Cl.$^5$ .............................................. F01L 1/34
[52] U.S. Cl. .............................. 123/90.15; 123/90.17; 123/90.31
[58] Field of Search ............... 123/90.15, 90.16, 90.17, 123/90.31

[56] References Cited

U.S. PATENT DOCUMENTS

| | | | |
|---|---|---|---|
| 4,928,640 | 5/1990 | van Vuuren et al. | 123/90.17 |
| 4,995,351 | 2/1991 | Ohkubo et al. | 123/90.15 |
| 5,140,955 | 8/1992 | Sono et al. | 123/90.15 |
| 5,184,578 | 2/1993 | Quinn, Jr. et al. | 123/90.17 |
| 5,203,290 | 4/1993 | Tsuruta et al. | 123/90.17 |
| 5,209,202 | 5/1993 | Maurer et al. | 123/90.17 |
| 5,222,465 | 6/1993 | Sakamoto et al. | 123/90.17 |
| 5,245,968 | 9/1993 | Kolias et al. | 123/90.15 |

FOREIGN PATENT DOCUMENTS 1134010 5/1989 Japan .

Primary Examiner—E. Rollins Cross
Assistant Examiner—Weilun Lo
Attorney, Agent, or Firm—Cushman, Darby & Cushman

[57] ABSTRACT

A spool valve for controlling the valve operation timing of an Internal combustion engine has its spool moved in accordance with an output duty Td so that an actual relative rotational angle $\theta$ may approach the target relative rotational angle $\theta a$ which is determined in accordance with the operating conditions of the engine. Here, the output duty Td is a sum of a learning ignition advance duty Ta and a temperature correcting duty Tthw. When the output duty Td is outputted, the spool is moved to a position where an oil pressure passage starts to be opened. From this position, the spool is further moved toward an ignition advance by the duty according to a deviation $(\theta a - \theta)$. When the relative rotational angle $\theta$ approaches the angle $\theta a$, a learning holding duty Th is outputted in place of the duty Ta so that the spool is controlled to a position where the oil pressure passage is closed. Incidentally, in case of movement toward an ignition lag, a learning ignition lag angle duty Tr is outputted in place of the duty Ta.

5 Claims, 9 Drawing Sheets $\theta = \theta 1 - \theta 2$

VARIABLE VALVE OPERATION TIMING CONTROL DEVICE

BACKGROUND OF THE INVENTION

1. Field of the Invention

The present invention relates to a variable valve operation timing control device (VTT) for varying the valve operation timing of an internal combustion engine in accordance with the operating conditions of the engine.

2. Description of the Prior Art

As a mechanism for controlling the operation timings of intake valves variably in accordance with the operating conditions of an internal combustion engine, there has been known the variable valve operating timing control device for varying the rotational phase of a camshaft relative to a cam pulley rotating in synchronism with a crankshaft.

The variable valve operation timing control device, as disclosed in Japanese Patent Laid-Open No. 134010/1989, for example, is constructed to include: timing varying means having a hydraulic servo valve for varying the operation (or valve) timings of the intake valves of the internal combustion engine; and hydraulic drive means having a hydraulic cylinder for driving the spool of the servo valve.

In this prior art, moreover, two control valves of the hydraulic drive means are opened or closed to move the servo valve at a constant speed thereby to vary the valve timing of the timing varying means.

Thus in the prior art, the variable valve operation timing control device is complicated because its timing changing means and hydraulic drive means have to be equipped with the separate hydraulic system.

In the prior art, moreover, what is controlled by the two ON/OFF valves is to interrupt the individual supplies of the oil pressures. As a result, the prior art has found it difficult to control the movements of the servo valve delicately and its moving speed and to control the valve operation timing only finely and the moving speed to a desired value. Thus, the prior art is accompanied by a problem that it cannot perform finer controls.

It is, therefore, conceivable to adopt not the ON/OFF valve but a valve capable of controlling the quantity of oil by controlling its degree of opening to change the valve operation timing at a desired rate. If, however, this valve is used, the drive signal of the valve and the change of the valve operation timing may fail to be accurately timed, because of the dispersion in the valve manufacture or the oil leakage from the valve.

This results in another problem that the valve operation timing cannot be held as it is or cannot be varied.

SUMMARY OF THE INVENTION

In view of the above-specified problems of the prior art, the present invention has an object to provide a variable valve operation timing control device which can have its whole structure simplified and which can control the valve operation timing accurately and variably without any influence of dispersion in the valve manufacture even if it uses a valve capable of controlling the quantity of oil in accordance with the control of opening.

According to an aspect of the present invention, there is provided an intake valve operation timing control device for an internal combustion engine having a crankshaft, comprising: a crankshaft side member made rotatable in synchronism with said crankshaft for establishing a driving force; a camshaft made rotatable in response to said driving force; a hydraulic piston arranged axially movably between said crankshaft side member and said camshaft for varying a phase between said crankshaft side member and said camshaft; an oil pressure chamber formed in the axial direction of said hydraulic piston; an oil pressure passage communicating with said oil pressure chamber; a valve disposed in said oil pressure passage for adjusting the quantity of oil to be fed to said oil pressure chamber, in accordance with its opening; drive means for adjusting the opening of said valve in accordance with a drive signal inputted from the outside; relative rotational angle detecting means for detecting a relative rotational angle between said crankshaft and said camshaft; target relative rotational angle calculating means for calculating a target relative rotational angle between said camshaft and said crankshaft in accordance with the operating conditions of said engine; control means for calculating the drive signal of said drive means for varying said relative rotational angle to said target relative rotational angle, in accordance with said relative rotational angle and said target relative rotational angle; and learning means for detecting the operating condition of said hydraulic piston in terms of the relative rotational angle which is detected by said relative rotational angle detecting means, to learn the drive signal of said drive means for bringing said hydraulic piston into a predetermined operating state, and to correct the drive signal which is calculated by said control means in accordance with the value of the learned drive signal.

According to the construction of the variable valve operation timing control device of the present invention described above, when the opening of the valve is controlled, the quantity of oil according to the opening is fed to the oil pressure chamber communicating with the oil pressure passage. Moreover, the hydraulic piston is axially moved according to the quantity of oil so that the relative rotational angle between the camshaft and the crankshaft side member is varied to establish a relative rotational angular difference.

Moreover, the control means calculates the drive signal for controlling the opening of the valve so that the actual relative rotational angle may coincide with the target relative rotational angle (i.e., the rotational angular difference) calculated according to the operating conditions of the engine.

Here, the leaning means detects the operating condition of the hydraulic piston in accordance with the detected relative rotational angle and learns (or renews) and stores the drive signal for bringing the hydraulic piston into a predetermined operating state. As a result, when this learned drive signal is outputted to the drive means, the valve is always accurately controlled to the opening necessary for bringing the hydraulic piston into the predetermined operating state. Then, the learning means corrects the drive signal outputted from the control means, in accordance with the learned and stored drive signal.

Thus, the drive signal to be inputted to the drive means can ensure such an operating state of the hydraulic piston as is necessary for controlling the relative rotational angle to the target rotational angle, thereby to ensure the valve opening necessary for the operating state.

In case, therefore, an error is caused in the relation between the drive signal and the change in the valve operation timing by the dispersion in the valve manufacture or the oil leakage of the valve, the error can be compensated to control the valve accurately to the opening in which the hydraulic piston is always in the predetermined operating state.

As a result, by correcting the drive signal calculated by the control means in accordance with the learned drive signal, the valve can be accurately controlled to ensure the coincidence between the relative rotational angle and the target relative rotational angle, so that the valve operation timings can be accurately controlled.

DESCRIPTION OF THE PREFERRED EMBODIMENTS

Here will be described a variable valve operation timing control device according to one embodiment of the present invention with reference to the accompanying drawings.

Figure 1:
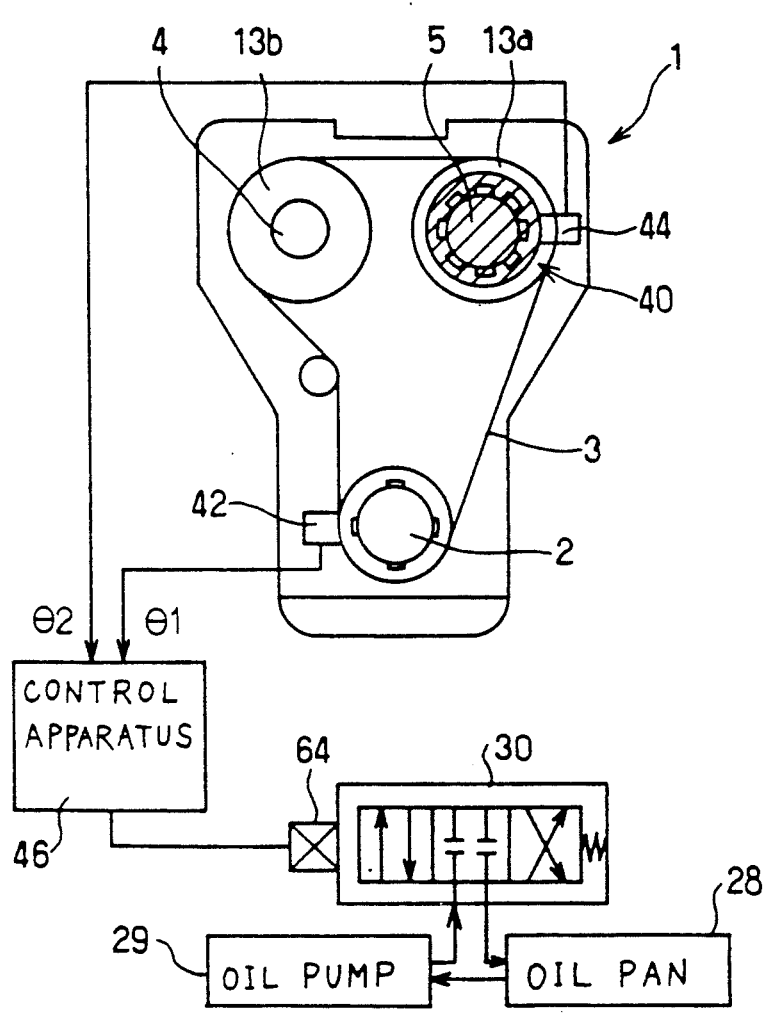
FIG. 1 is a schematic diagram showing the construction of an embodiment of the present invention.
Figure 2:
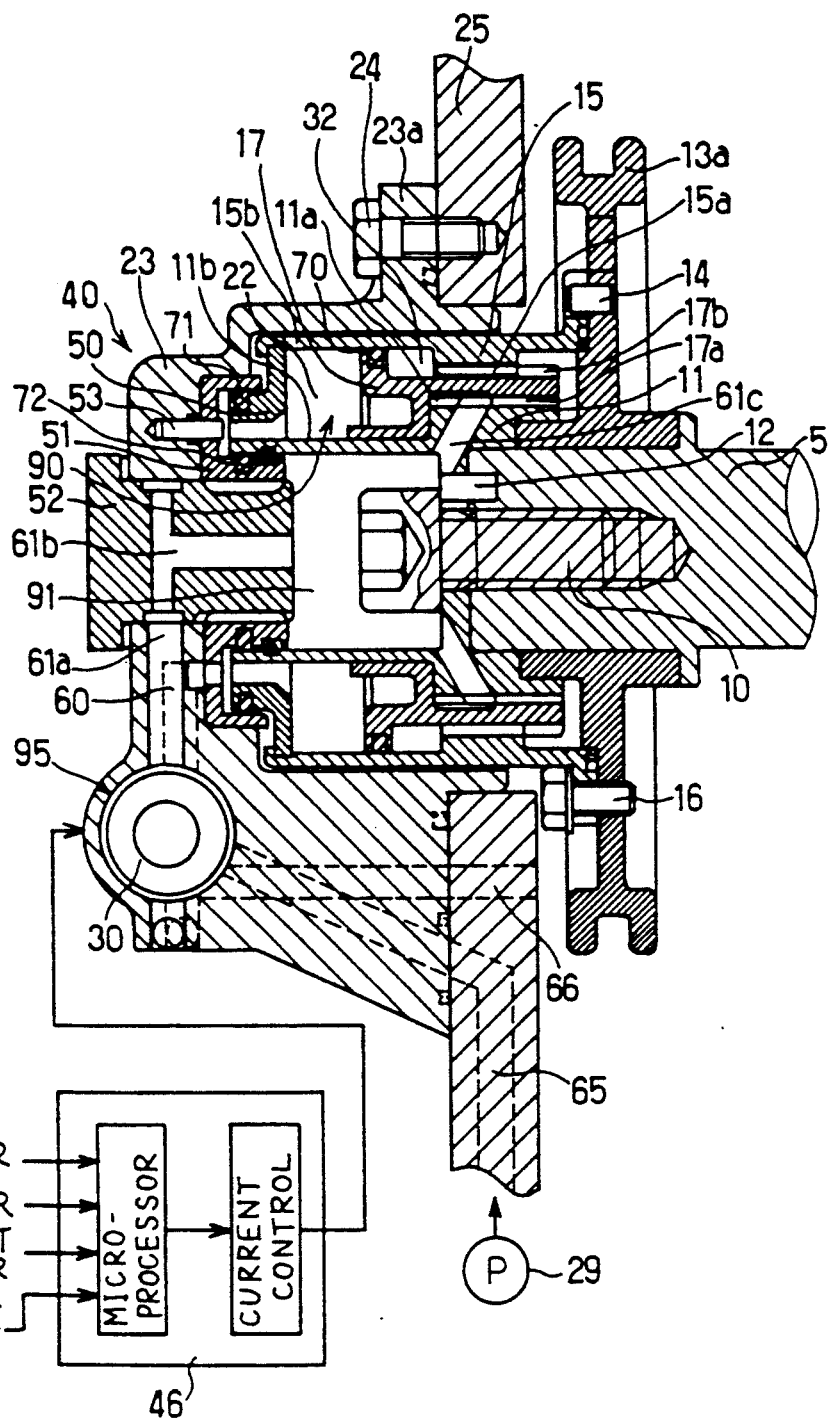
FIG. 2 is a section showing an essential portion of a variable valve operation timing control device according to the embodiment of the present invention.

FIG. 1 is a schematic diagram showing the embodiment in which the present invention is applied to a dual overhead camshaft type internal combustion engine, and FIG. 2 is a section showing a variable valve operation timing control device.

In an internal combustion engine 1, a pair of camshafts 4 and 5 are driven through a pair of sprockets 13a and 13b by a timing chain 3 for transmitting a driving force from a crankshaft 2.

The camshaft S is equipped with the variable valve operation timing control device 40, as hatched in FIG. 1.

On the other hand, the crankshaft 2 is equipped with a crank sensor 42 for detecting the position thereof whereas the camshaft 5 is equipped with a cam sensor 44 for detecting the position thereof. Here, if the crank sensor 42 produces an N number of pulses when the crankshaft 2 makes one rotation, the cam sensor 44 produces a 2N number of pulses when the camshaft 5 makes one rotation. Moreover, if the camshaft 5 has the maximum $\theta$ max of the operation timing varying angle in terms of the crank angle, the pulse number N is so determined as to satisfy the relations of N<360 degrees<$\theta$ max. As a result, when a later-described actual relative rotational angle $\theta$ (i.e., the difference between the rotational angular positions of the two shafts 2 and 5) is to be calculated, it is possible to employ the pulses of the crank sensor 42 and the pulses of the cam sensor 44, the latter pulses being produced subsequent to the former pulses.

The signals of these crank sensor 42 and cam sensor 44 are inputted to a control apparatus 46. In addition to these signals, a coolant temperature signal, a throttle opening signal and the like of the internal combustion engine are inputted so that a microprocessor of the control apparatus 46 calculates a target relative rotational angle $\theta$a (i.e., the difference between the rotational angular positions of the two) of the camshaft 5 relative to the crankshaft 2 in accordance with the above-enumerated signals. Then, the drive signal thus calculated by the control apparatus 46 is inputted to a later-described linear solenoid 64 acting as an electromagnetic actuator to drive a later-described spool valve 30. By driving this spool valve 30, moreover, the quantity of oil to be pumped from an oil pan to the variable valve operation timing control device 40 by an oil pump 29 is controlled.

Here will be described the construction of the variable valve operation timing control device 40.

In FIG. 2, the camshaft 5 is equipped at its end portion with a generally cylindrical camshaft sleeve 11 which is so fixed by a pin 12 and a bolt 10 such that it may rotate integrally with the camshaft 5. On the other hand, the camshaft sleeve 11 is formed partially in the outer circumference thereof with an external helical spline 11a. Moreover, the camshaft sleeve 11 is formed with a cylindrical portion 11b to project into a housing 23 mounted on a cylinder head 25 by means of bolts 24.

On the other hand, the sprocket 13a is so supported between the camshaft 5 for driving the well-known intake valves, although not shown, and the camshaft sleeve 11 that it can rotate relative to the camshaft 5 while being axially immovable. To the lefthand side of the sprocket 13a, as shown in FIG. 2, there is so fixed a sprocket sleeve 15 or a generally cylindrical crankshaft side member by means of a pin 14 and a bolt 16 that it can rotate integrally with the sprocket 13a. The sprocket sleeve 25 is formed with a cylindrical portion 15b which projects into the housing 23 to cover the aforementioned camshaft sleeve 11. This projecting cylindrical portion 15b is formed partially in its inner circumference with an internal helical spline 15a. This internal helical spline 15a is formed to have an angle of torsion in the direction opposed to that of the aforementioned external helical spline 11a. Incidentally, the external helical spline 11a or the internal helical spline 15a may be replaced by a spline having axially parallel straight teeth by reducing the angle of torsion to zero.

Into a portion of the gap between the cylindrical portion 11b of the camshaft sleeve 11 and the cylindrical portion 15b of the sprocket sleeve 15, there is formed an annular space 90 having a substantially uniform section in the axial direction, there is inserted a generally cylindrical hydraulic piston 17 such that it can slide liquid-tight in the axial directions in that space 90.

The hydraulic piston 17 is partially in its inner face with an internal helical spline 17a, which is in meshing engagement with the external helical spline 11a of the camshaft sleeve 11, and partially in its outer face with an external helical spline 17b which is in meshing engagement with the internal helical spline 15a of the sprocket sleeve 15. As a result of these meshing engagements of the splines, the rotation of the crankshaft 2 transmitted to the sprocket 13a through the timing chain shown in FIG. 1 is transmitted through the sprocket sleeve 15, the hydraulic piston 17 and the camshaft sleeve 11 to the camshaft 5. Moreover, a flange formed at the lefthand end portion of the hydraulic piston 17 is equipped on its outer circumference with an oil seal 70. This oil seal 70 is positioned to contact with the inner circumference of the cylindrical portion 15b of the sprocket sleeve 15.

The space 90 thus formed is partitioned into two chambers by the hydraulic piston 17, that is, an advance oil pressure chamber 22, as located at the lefthand side of the hydraulic piston 17, and a retard oil chamber 32, as located at the righthand side. These oil pressure chambers 22 and 32 are sealed up by the aforementioned oil seal 70.

To the lefthand open end of the sprocket sleeve 15, on the other hand, there is fixed an end plate 50. This end plate 50 is formed with a cylindrical portion and a flange which is formed at the righthand end of the cylindrical portion and fixed to the open end of the sprocket sleeve 15, The end plate 50 is formed in the outer circumference of its cylindrical portion with a groove, in which is retained an oil seal 71.

The end plate 50 and the camshaft sleeve 11 are equipped at their lefthand end portions with an annular ring plate 51 which is fixed on the housing 23 by means of a knock pin 53. This ring plate 51 is formed to have a generally C-shaped section, in which are rotatably fitted the cylindrical portion 11b of the camshaft sleeve 11 and the cylindrical portion 11b of the camshaft sleeve 11. On the other hand, the ring plate 51 is formed in the outer circumference of its inner cylindrical portion with a groove, in which is retained an oil seal 72. This oil seal 72 seals up the ring plate 51 and the camshaft sleeve 11. On the other hand, the aforementioned oil seal 71 seals up the end plate 50 and the ring plate 51. As a result, the advance oil pressure chamber 22 is sealed up.

A bolt 52 is fastened in the center opening of the ring plate 51 and the opening of the housing 23 to establish a space 91 between the inner circumference of the camshaft sleeve 11 and the camshaft 5. On the other hand, the bolt 52 is formed therein with an oil pressure passage 61b of T-shaped section communicating with that space 91. The bolt 52 is further formed in its outer circumference with an annular groove for providing the communication between the two radial ends of the oil pressure passage 61b.

On the other hand, the housing 23 is formed with an oil pressure passage 61a having communication with the annular groove of the aforementioned bolt 52. This oil pressure passage 61a communicates with the space 91 through the generally T-shaped oil pressure passage 61b and further with the aforementioned retard oil pressure chamber 32 through an oil pressure passage 61c formed in the camshaft sleeve 11. The housing 23 is further formed with an oil pressure chamber 60 having communication with the aforementioned oil pressure chamber 22.

These oil pressure passages 81a and 80 are formed in the housing 23 and opened into a space 95 mounting the later-described spool valve 30. Into this space on the other hand, there are opened an oil pressure supply passage 85 for feeding the oil pumped from the oil pan 28 of the internal combustion engine 1 by the oil pump 29, and an oil pressure release passage 66 for returning the oil to the oil pan 28.

Figure 3A:
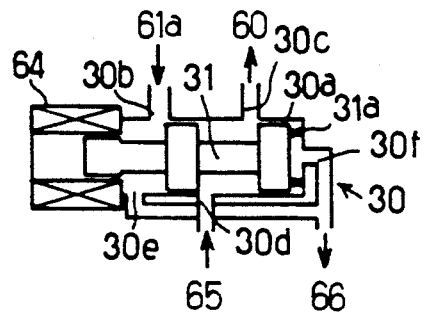
FIGS. 3A to 3C are sections showing spool valves which are operative to switch an oil pressure passage.
Figure 3B:
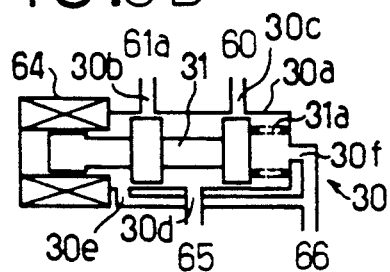
Figure 3C:
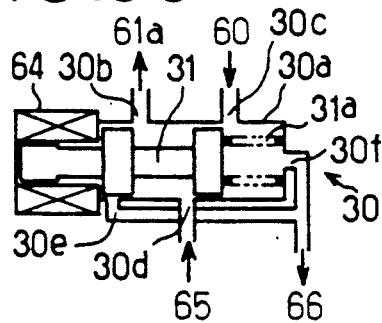

Here will be described the construction of the spool valve 30 in the following with reference to FIG. 3, of which FIGS. 3A, 3B and 3C present sections of the spool valve 30 when the oil pressure passages are to be switched, although its operations will be described hereinafter.

The spool valve 30 is fitted in the space 95 and has its cylinder 30a formed with an oil pressure port 30b communicating with the aforementioned oil pressure passage 61a and an oil pressure port 30c communicating with the oil pressure passage 60. The cylinder 30a is further formed with a suction port 30d communicating with an oil pressure passage 65 and with release ports 30e and 30f communicating with an oil pressure release passage 66. In the cylinder 30a, on the other hand, there is fitted a spool 31 which can slide therein to switch the communications of the above-enumerated ports. At the righthand side of the spool 31, there is mounted a spring 31a for urging the spool 31 leftward of the drawing. At the lefthand side of the spool 31, there is further mounted the linear solenoid 64 acting as an electromagnetic actuator. By the electromagnetic force generated by the linear solenoid 64, the spool 31 is moved rightward of the drawing against the biasing force of the spring 31a.

Here will be described the operations of switching the oil pressure passages in accordance with the movement of the spool 31 in the spool valve 30.

When the spool 31 moves to the right, as shown in FIG. 3A, the suction port 30d and the oil pressure port 30c are opened to provide the communication between the oil pressure supply passage 65 and the oil pressure passage 60. As a result, the oil pressure from the oil pump 29 is supplied to the advance oil pressure chamber 22. At the same time, the release port 30e and the oil pressure port 30b are opened to provide the communication between the oil pressure passage and the oil pressure release passage 66. As a result, the oil pressure of the retard oil pressure chamber 32 is released. As a result, the hydraulic piston 17 moves to the right so that the camshaft 5 advances relative to the sprocket 13a, i.e., the crankshaft 2.

When the spool 31 moves to the left, as shown in FIG. 3C, the suction port 30d and the oil pressure port 30b are opened to provide the communication between the oil pressure supply passage 65 and the oil pressure passage 61a so that the oil pressure from the oil pump 29 is supplied to the ignition lag oil pressure chamber 32. On the other hand, the release port 30f and the oil pressure port 30c are opened to provide the communication between the oil pressure passage 60 and the oil pressure release passage 66. As a result, the oil pressure of the ignition advance oil pressure chamber 22 is released. As a result, the hydraulic piston 17 moves to the left so that the camshaft 5 is delayed relative to the sprocket 13a, i.e., the crankshaft 2.

Figure 6:
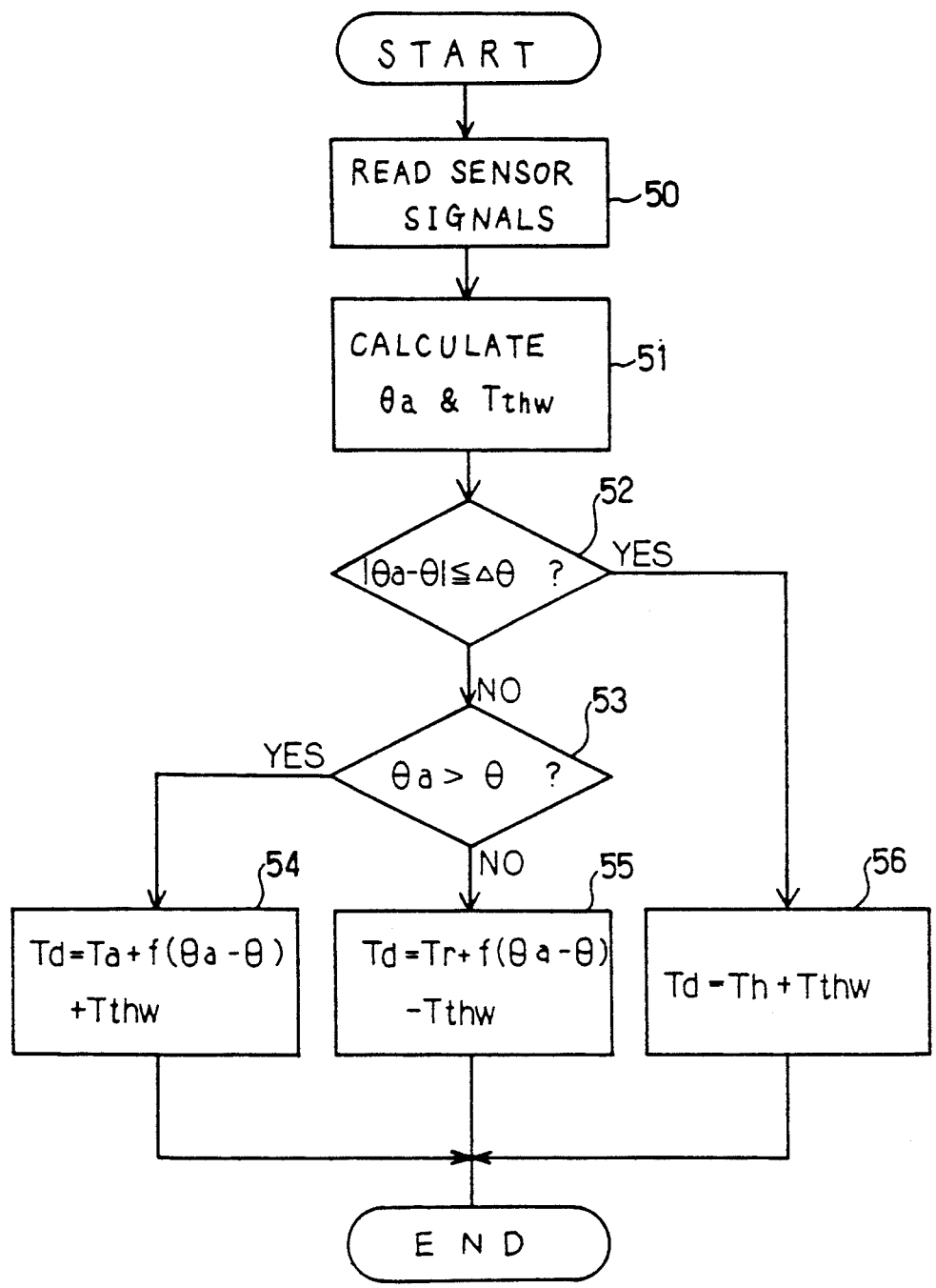
FIG. 6 is a flow chart illustrating a control method according to an embodiment of the present invention.

Here will be described the fundamental operations of the variable valve operation timing control device of the present embodiment with reference to the flow chart of FIG. 6. Incidentally, this flow chart of FIG. 6 extracts the step of controlling the rotational angle in a feedback manner from the processing of the control apparatus 46.

Figure 4:
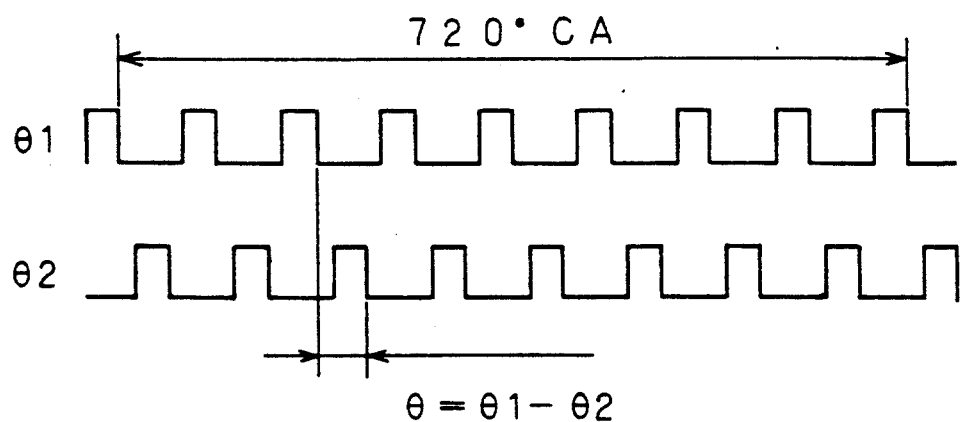
FIG. 4 is a time chart illustrating a relation between a crank angle and a cam angle.
Figure 5:
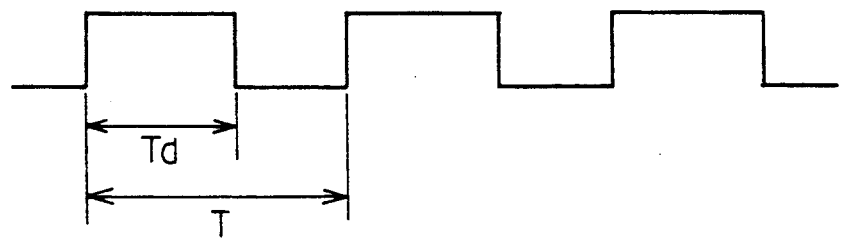
FIG. 5 is a waveform chart showing an output duty coming from a microprocessor.

At Step 50, sensor signals coming from the crank sensor 42, the cam sensor 44 and other sensors are read. In accordance with the signals of those two sensors 42 and 44, as shown in FIG. 4, the actual relative rotational angle $\theta$ between a crank position angle $\theta1$ and a cam position angle $\theta2$ (i.e., the difference between the rotational angular positions between the two) is calculated.

Figure 7:
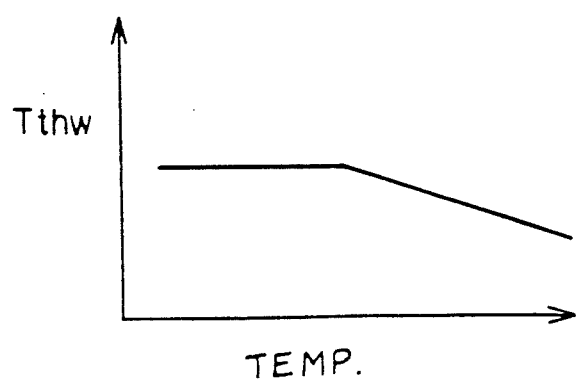
FIG. 7 is a characteristic diagram illustrating a relation between a coolant temperature and a coolant temperature correcting duty.

At Step 51, there are calculated: the target relative rotational angle $\theta a$ (i.e., the difference between the rotational angular positions of the two) as the relative rotational angle of the camshaft 5 relative to the crankshaft 2 in accordance with the operating conditions of the engine at this time; and a coolant temperature correcting duty Tthw for correcting the discrepancy of the characteristics of the spool valve 30. Incidentally, the relation between this coolant temperature correcting duty Tthw and the coolant temperature is illustrated in FIG. 7.

At Step 52, it is determined whether or not the deviation between the relative rotational angle $\theta$ between the crankshaft 2 and the camshaft 5 and the target relative rotational angle $\theta a$ is smaller than a predetermined allowable deviation $\Delta\theta$.

If $|\theta a - \theta| \geq \Delta\theta$, the routine advances to Step 56, at which the output duty Td is outputted as Td=Th+Tthw from the microprocessor of the control apparatus 46. Here, the value Th indicates a learning holding duty, i.e., a drive signal for establishing an operating state in which the hydraulic piston 17 is held. In other words, the relative rotation angle $\theta$ between the crankshaft 2 and the camshaft 5 is held in that state by that duty. The method of learning the duty Th will be described hereinafter.

If $|\theta a - \theta| > \Delta\theta$, on the other hand, the routine advances to Step 53, at which it is determined whether $\theta > \theta$ or not.

If $\theta a > \theta$, the output duty Td is outputted as Td=Ta+f($\theta a - \theta$)+Tthw at Step 54. Here, the value Ta is a learning advance duty or the drive signal for establishing an operating state in which the hydraulic piston 17 starts to move toward the advance. In other words, the relative rotational angle $\theta$ is enabled to vary toward the advance by that duty. The method of this learning advance duty Ta will be described hereinafter.

If $\theta a \leq \theta$, on the other hand, the output duty Td is outputted as Td=Tr+f($\theta a - \theta$)-Tthw at Step 55. Incidentally, the value Tr is a learning retard duty or the drive signal for establishing an operating state in which the hydraulic piston 17 starts to move toward the ignition lag. In other words, the relative rotational angle $\theta$ is enabled to vary toward the retard by that duty. The method of this learning retard duty Tr will be described hereinafter.

Moreover, the value of f($\theta a - \theta$) appearing in the output duty Td of Steps 54 and 55 is the feedback correcting duty according to the deviation ($\theta a - \theta$). This function f is a control function proportional to and differentiated from the deviation ($\theta a - \theta$). Incidentally, the function f may be a control function including an integration.

Thus, the relative rotational angle $\theta$ is feedback-controlled in the control apparatus 46. At this time, the hydraulic piston 17 is so moved by the output duty Td outputted from the control apparatus 46 that the relative rotational angle $\theta$ may coincide to the target relative rotational angle $\theta a$. Moreover, when the deviation between the relative rotational angle $\theta$ and the target relative rotational angle $\theta a$ comes into an allowable range, the output duty is determined as the sum of the learning holding duty Th and the temperature correcting duty Tthw. As a result, the hydraulic piston 17 is held in the position where the relative rotational angle $\theta$ is the target relative rotational angle $\theta a$.

Figure 8:
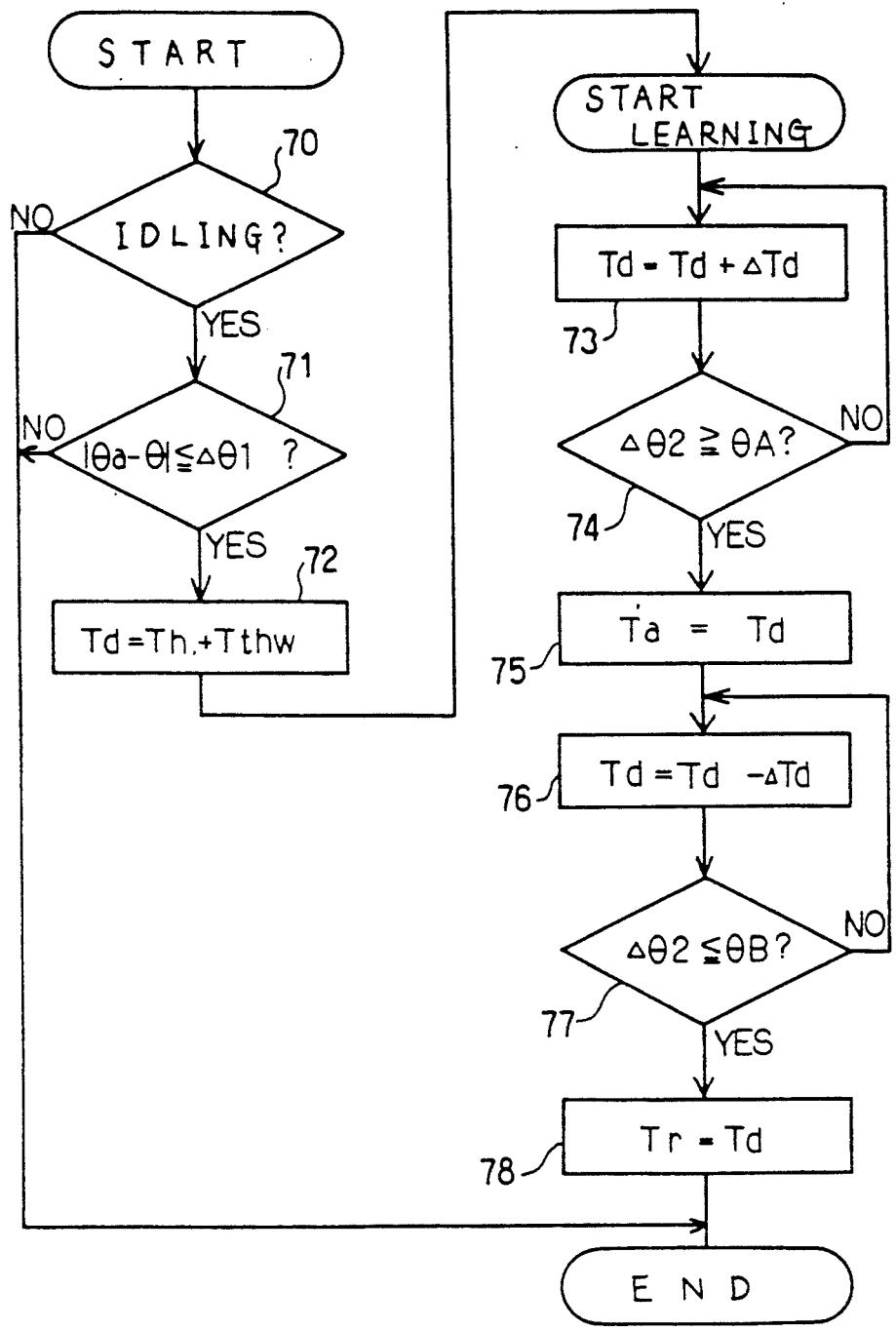
FIG. 8 is a flow chart illustrating a routine for learning a learning ignition advance duty Ta and a learning ignition lag duty Tr.

Next, the method of learning the learning advance duty Ta and the learning retard duty Tr for quickly starting the variation of the relative rotational angle between the crankshaft 2 and the camshaft 5 will be described with reference to the flow chart shown in FIG. 8. Incidentally, this routine is executed together with the routine of FIG. 6.

First of all, a learning condition is determined. At Step 70, it is determined whether or not the internal combustion engine 1 is in its idling condition. Then, the learning routine advances to Step 71, if in the idling condition, but this routine is ended if not.

When the engine is stable in its idling condition, it is determined at Step 71 whether or not the deviation $|\theta a - \theta|$ between the predetermined target relative rotational angle $\theta a$ and the relative rotational angle $\theta$ is within a predetermined allowable deviation $\Delta\theta1$. If this allowable deviation is reached, it is determined that the hydraulic piston 17 has converged to the aforementioned target relative rotational angle $\theta a$, and the routine advances to Step 72. Otherwise, the present learning routine is ended.

At Step 72, the output duty Td is outputted as the sum of the learning holding duty Th and the temperature correcting duty Tthw so that the relative rotational angle $\theta$ between the crankshaft 2 and the camshaft 5 may be held as it is. When the relative rotational angle $\theta$ is held by that output duty Td, it is determined that the learning conditions are satisfied, and the learning is started to renew and store the learning duty duties Ta, Tr.

At Step 73, a predetermined duty $\Delta$Td is added to the output duty Td stored already. This addition is continued till the spool 31 is moved to establish the communication between the oil pressure supply passage 65 and the oil pressure passage 60. As this communication is begun to increase the quantity of oil to be fed to the advance oil pressure chamber 22, the hydraulic piston 17 is moved to the right of FIG. 2 to increase the relative rotational angle $\theta$.

At Step 74, the increase $\Delta\theta2$ of the relative rotational angle $\theta$ for a predetermined period is detected and compared with a predetermined value $\theta A$ to determine whether or not $\Delta\theta2 \geq \theta A$. In other words, it is determined whether or not the moving speed of the hydraulic piston 17 toward the advance exceeds a predetermined value, that is, whether or not the spool 31 of the spool valve 30 is in the position to start the communication between the oil pressure supply passage 65 and the oil pressure passage 60. If $\Delta\theta2 \leq \theta A$, on the other hand, the routine is returned again to Step 73, at which the predetermined duty $\Delta$Td is added.

When the relations of $\Delta\theta2 \geq \theta A$ is achieved by repeating those feedbacks so that the changing speed of the relative rotational angle $\theta$ toward the advance exceeds the predetermined value, the output duty Td at this time is stored as the learning advance duty Ta at Step 75.

After this, at Step 76, the predetermined duty $\Delta$Td is subtracted from the output duty Td at that time. Then, this subtraction is continued till the spool 31 is moved to establish the communication between the oil pressure supply passage 65 and the oil pressure passage 61a. As this communication is restored so that the quantity of oil to the retard oil-pressure chamber 32 is increased, the hydraulic piston is moved to the left of FIG. 2 to decrease the relative rotational angle $\theta$.

At Step 77, the reduction $\Delta\theta2$ ($<0$) of the relative rotational angle $\theta$ for the predetermined period is detected and compared with a predetermined value $\theta B$ ($<0$) to determine whether or not the relations of $\Delta\theta2 \leq \theta B$ are satisfied. In other words, it is determined whether the speed of the hydraulic piston 17 toward the retard has exceeded a predetermined value, that is, whether or not the spool 31 of the spool valve 30 has come to the position in which the communication between the oil pressure supply passage 65 and the oil pressure passage 61a is started. If $\Delta\theta \geq \theta B$, the routine is returned again to Step 76, at which the subtraction is executed with the predetermined duty $\Delta Td$.

When the relations of $\Delta\theta \leq \theta B$ is achieved by repeating those feedbacks so that the changing speed of the relative rotational angle $\theta$ toward the ignition lag exceeds the predetermined value, the output duty Td at this time is stored as the learning advance duty Tr at Step 78.

In the present embodiment, the learning duties are calculated all over the operating range by correcting the learning duties Ta and Tr, which are learned in the idling condition, with the correcting coefficients of the coolant temperature and the r.p.m. of the engine. And, the learning duties are used for calculating the output duty Td at Steps 54 and 55 in FIG. 6.

In the present embodiment, the duties learned in the idling condition are corrected in the individual operating conditions so that the corrected values are applied to the whole operating range. On the contrary, if the learning values in the individual operating conditions are calculated unlike the present embodiment, there arises a problem that the calculation load upon and the storing area of the control apparatus 46 are increased, as compared with those of the present embodiment. In the present embodiment, however, the learning duties all over the operating range can be calculated merely by leaning in the idling condition so that the scale of the control apparatus 46 can be reduced.

By learning the aforementioned learning duties Ta and Tr, the spool 31 can be driven without fail till the oil pressure passages 60 and 61a start to be opened when the hydraulic piston 17 is to be moved. Moreover, the quantity of oil to the oil pressure chamber 22 or 32 can also be increased without fall by moving the spool 31 farther from the position determined by the learning duties Ta and Tr. As a result, the moving speed of the hydraulic piston 17 can be determined to a desired value. Thus, the variation of the valve operating timings can be controlled to a desired speed.

Even if, moreover, the driven distance of the spool 81 relative to the output duty is varied by the dispersions in the manufacture of the spool valve and the linear solenoid 64, the spool 31 can be driven without fail to the position in which the oil starts to be supplied to the oil pressure chamber 22 or by learning the varied component through the aforementioned learning control and renewing the learning duty.

Figure 9:
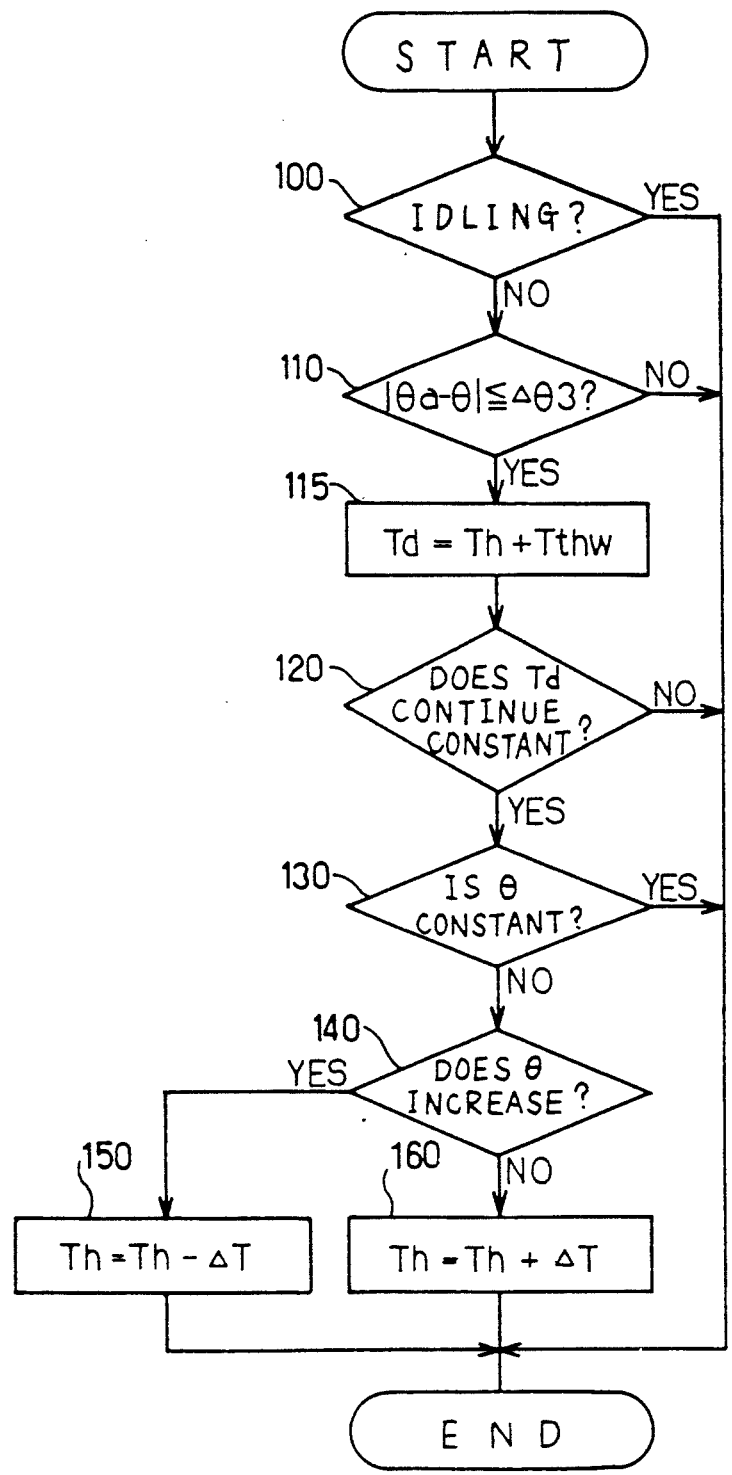
FIG. 9 is a flow chart illustrating a routine for learning a learning holding duty Th.

Next, the method of learning the learning holding duty so that the relative rotational angle $\theta$ between the crankshaft and the camshaft may be held unvaried will be described with reference to the flow chart shown in FIG. 9. Incidentally, this routine is executed together with the routines of FIGS. 6 and 8.

At Step 100, it is determined whether or not the internal combustion engine 1 is in its idling condition. If the answer is NO, the routine advances to Step 110, at which it is determined whether or not the absolute value of the deviation between the relative rotational angle $\theta$ between the crankshaft 2 and the camshaft 5 and the target relative rotational angle $\theta a$ is below an allowable deviation $\Delta\theta3$.

If this absolute value is no more than the deviation $\Delta\theta3$, the routine advances to Step 115, at which the output duty Td of the control apparatus 46 is outputted as the sum of the preceding learning holding duty Th and the temperature correcting duty Tthw.

At Step 120, it is determined whether or not the output duty Td has been outputted for a predetermined period or more. If the output duty is the aforementioned output valve for the predetermined period or more, the routine advances to Step 130.

At Step 130, it is determined whether or not the relative rotational angle $\theta$ is constant, that is, the relative rotational angle $\theta$ has varied when the duty Td is constant for a predetermined period or more.

If the angle $\theta$ is unchanged, it is determined that the relative rotational angle $\theta$ is sufficiently held by the learning holding duty Th at this time, and this routine is ended.

With the angle $\theta$ varied, on the contrary, it is determined whether or not it has increased more than the preceding relative rotational angle.

If the answer is YES, the learning holding duty Th is subtracted at Step 150 by the predetermined duty $\Delta T$. If the answer is NO, on the contrary, the learning holding duty Th is increased at Step 160 by the predetermined duty $\Delta T$.

By repeating these renewals of the duty Th, the spool 31 can be driven without fail to the position where it closes the oil pressure passage 60 or 61a. As a result, the relative rotational angle $\theta$ between the crankshaft 2 and the camshaft 5 can be held without fail.

Even if, moreover, the oil leaks from the oil pressure chambers 22 and 32 due to the manufacture dispersion of the variable valve operation timing control device 40 so that the hydraulic piston 17 moves, the learning holding duty Th can be renewed to move the spool 31 to the position where the oil in a quantity equal to that of the leakage is fed to those oil pressure chambers. As a result, the relative rotational angle $\theta$ can be held at all times.

By learning the target output duty, as described above, the troubles due to the manufacture dispersion of the spool valve 30 can be eliminated to control the spool valve 30 without fall so that the hydraulic piston 17 may be moved at a high speed to an arbitrary position and held in the position. As a result, the internal combustion engine 1 can always be operated at a desired valve timing to improve the fuel economy, the emission control and the output power.

Here will be described a second embodiment of the variable valve operation timing control device according to the present invention. Unlike the foregoing first embodiment in which the three learning duties Th, Ta and Th are learned, according to this second embodiment, the processing routine is simplified by learning only the learning holding duty Th.

Figure 10:
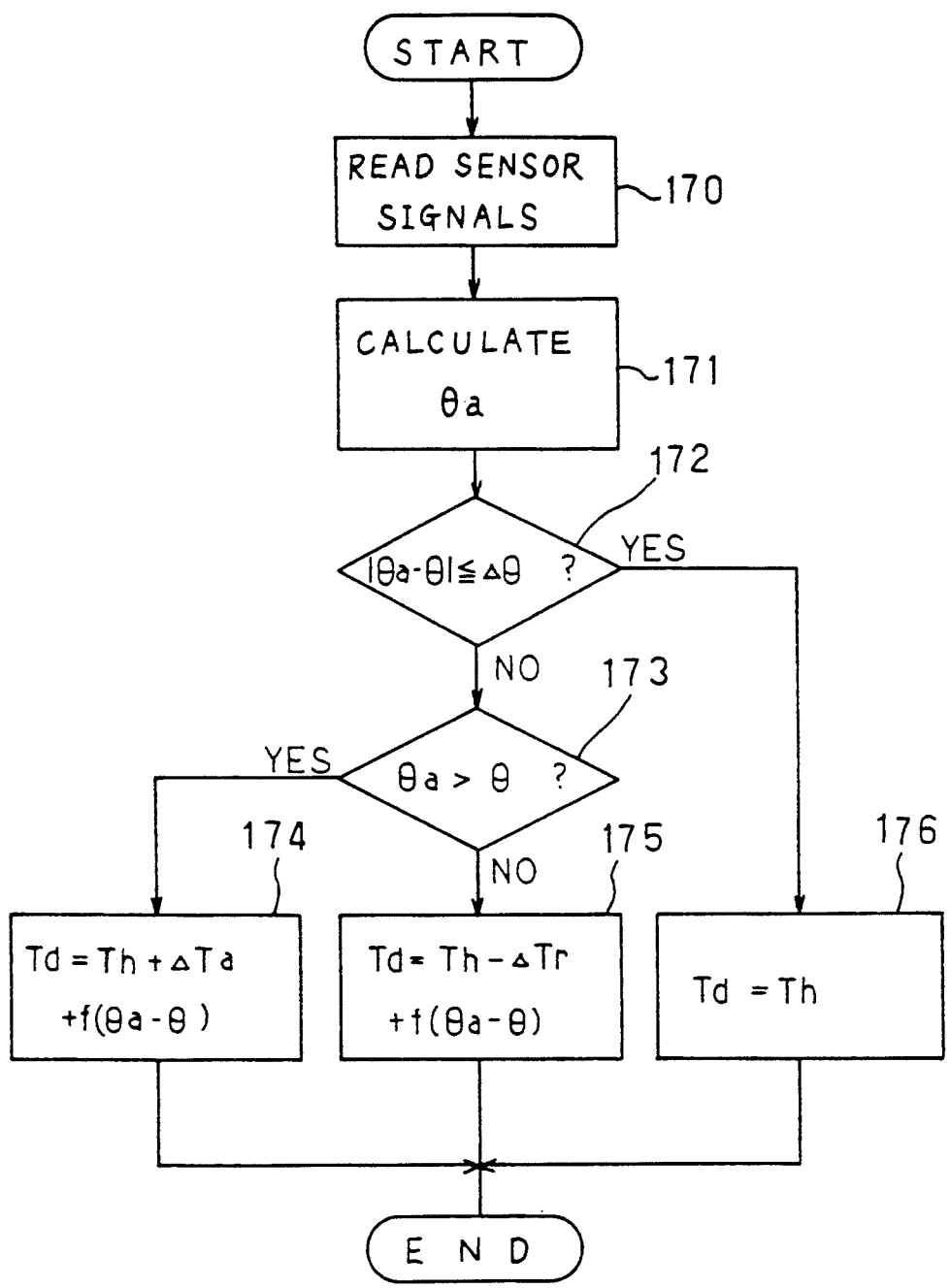
FIG. 10 is a flow chart illustrating a control method according to a second embodiment of the present invention.

Here will be described the control method according to the second embodiment with reference to the flow chart of FIG. 10.

At Step 170, the sensor signals coming from the crank sensor 42, the cam sensor 44 and other sensors are read to calculate a relative rotational angle $\theta$.

At Step 171, a target relative rotational angle $\theta a$ according to the operating conditions at this time is calculated.

At Step 172, it is determined whether or not the deviation between the relative rotational angle $\theta$ and the target relative rotational angle $\theta a$ is smaller than a predetermined allowable deviation $\Delta\theta$.

If $|\theta a - \theta| \leq \Delta\theta$, the routine advances to Step 176, at which the output duty Td coming from the microprocessor is outputted as the learning holding duty Th.

If $|\theta a - \theta| > \Delta\theta$, on the contrary, the routine advances to Step 173, at which it is determined whether or not $\theta a > \theta$.

If $\theta a > \theta$, the output duty Td is outputted as $Td = Th + \Delta Ta + f(\theta a - \theta)$ at Step 174. If $\theta a \leq \theta$, on the contrary, the output Duty Td is outputted as $Td = Th - \Delta Tr + f(\theta a - \theta)$ at Step 175.

Here, the value A Ta is the difference between the duty value, at which the hydraulic piston 17 starts to move toward the ignition advance, and the learning holding duty Th and is determined in advance. On the other hand, the value $\Delta Tr$ is the difference between the duty value, at which the hydraulic piston 17 starts to move toward the ignition lag, and the learning holding duty Th and is also determined in advance.

Figure 11:
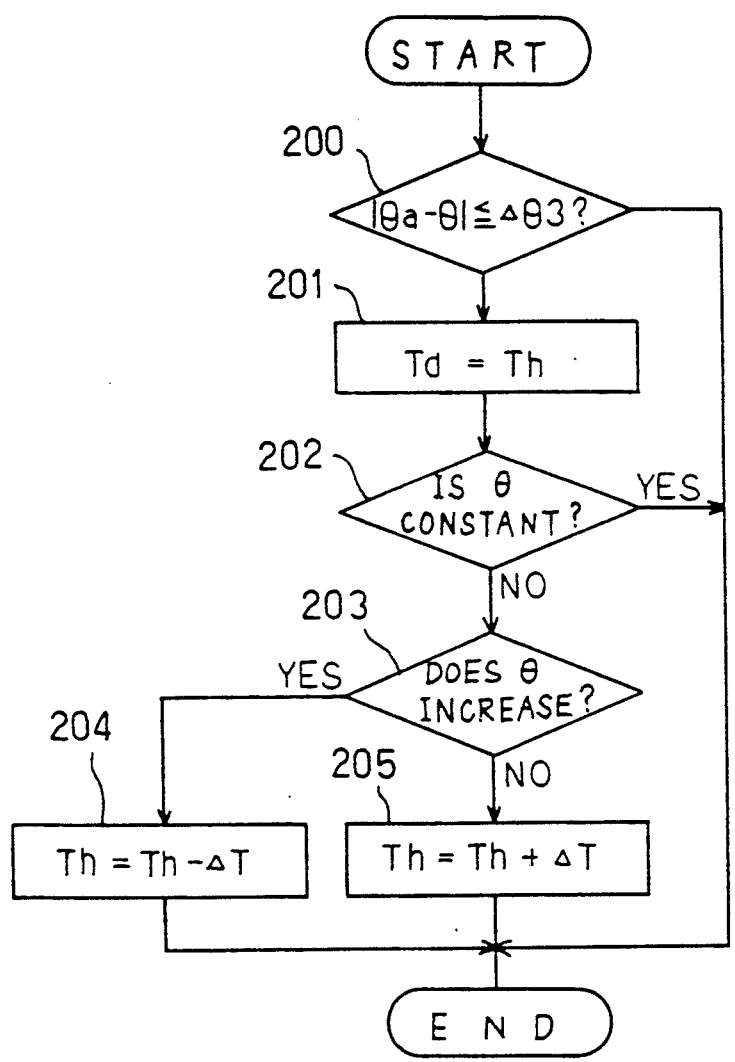
FIG. 11 is a flow chart illustrating a routine for learning the learning holding duty Th in the second embodiment.

Next, the routine for learning the learning holding duty Th of FIG. 10 will be described in the following with reference to the flow chart of FIG. 11.

At Step 200, it is determined whether or not the absolute value of the deviation between the relative rotational angle $\theta$ and the target relative rotational angle $\theta a$ is below the allowable deviation $\Delta\theta 3$.

If this absolute value is no more than the deviation $\Delta\theta 3$, the routine advances to Step 201, at which the output duty Td of the control apparatus 46 is held at the learning holding duty Th determined at this time.

At Step 202, it is determined whether or not the relative rotational angle $\theta$ is constant, that is, whether or not the relative rotational angle $\theta$ is varied with the duty Td which has been held constant at the learning holding duty Th at Step 201.

If the angle $\theta$ is varied, it is determined at Step 208 that the value $\theta$ has increased from the preceding value.

If the answer is YES, the learning holding duty Th is decreased by a predetermined duty $\Delta T$ at Step 204. If the answer is NO, on the contrary, the learning holding duty Th is increased by the predetermined duty $\Delta T$ at Step 160.

By repeating these operations, the spool 31 has its position so fixed that the relative rotational angle $\theta$ between the crankshaft 2 and the camshaft 5 can be held constant.

As has been described with reference to the flow charts of FIGS. 10 and 11, according to this second embodiment, the learning holding duty Th for holding the relative rotational angle $\theta$ in the desired position is learned. Moreover, when the valve operation timing is changed to the advance or retard side, the difference between the duty, at which the spool 31 is to be moved to the position for starting the variation of the valve operation timing, and the learning holding duty is set to the predetermined value (e.g., $\Delta Ta$ or $\Delta Tr$). As a result, the holding can be ensured with the desired valve operation timing to simplify the routine so that the processing program can be accordingly simplified.

What is claimed is:

1. An intake valve operation timing control device for an internal combustion engine having a crankshaft, comprising:

a crankshaft side member made rotatable in synchronism with said crankshaft for establishing a driving force;

a camshaft made rotatable in response to said driving force;

a hydraulic piston arranged axially movably between said crankshaft side member and said camshaft for varying a phase between said crankshaft side member and said camshaft;

an oil pressure chamber formed in the axial direction of said hydraulic piston;

an oil pressure passage communicating with said oil pressure chamber;

a valve disposed in said oil pressure passage for adjusting the quantity of oil to be fed to said oil pressure chamber, in accordance with an opening of said valve;

drive means for adjusting the opening of said valve in accordance with a drive signal inputted from a control apparatus;

relative rotational angle detecting means for detecting a relative rotational angle between said crankshaft and said camshaft;

target relative rotational angle calculating means for calculating a target relative rotational angle between said camshaft and said crankshaft in accordance with operating conditions of said engine;

control means for calculating the drive signal of said drive means for equalizing said relative rotational angle to said target relative rotational angle, in accordance with said relative rotational angle and said target relative rotational angle; and learning means for detecting the operating condition of said hydraulic piston in terms of the relative rotational angle which is detected by said relative rotational angle detecting means, to learn the drive signal of said drive means for bringing said hydraulic piston into a predetermined operating state, and to correct the drive signal which is calculated by said control means in accordance with the value of the learned drive signal.

2. A method of controlling the intake valve operation timings of an internal combustion engine including: a crankshaft; a plurality of intake valves; a camshaft operatively connected to said crankshaft to be driven thereby and drive said intake valves; a hydraulically-operated piston disposed for varying the angular rotational position of said camshaft relative to said crankshaft in accordance with a quantity of fluid supplied thereto; and an electrically-controlled valve for varying the quantity of fluid supplied to said piston in accordance with a duty signal fed thereto while having a varying duty signal, said method comprising the steps of:

detecting the actual rotational angular positions of said crankshaft and said camshaft;

calculating an actual rotational angular difference between said detected actual rotational angular positions;

determining a desired rotational angular difference between the rotational angular positions of said crankshaft and said camshaft in accordance with operating conditions of said engine;

calculating a further difference between said desired rotational angular difference and said actual rotational angular difference; and producing said duty signal to reduce said further difference, said duty signal producing step including:

(a) determining whether said further difference is larger or smaller than a predetermined value;

(b) determining said output duty in accordance with said further difference and a learning duty when said further difference is larger and smaller than said predetermined value, respectively;

(c) determining whether said actual difference is varying or not; and (d) renewing said learning duty, when it is determined at said step (c) that said actual difference is varying, so that said renewed learning duty may be used as said learning duty at said step (b).

3. A method according to claim 2, wherein said steps (c) and (d) are performed only when said engine is in its non-idling condition and when said output duty is determined by said learning duty and continues unchanged for a predetermined period.

4. A method according to claim 2, wherein said duty determining step (b) determines said output duty in accordance with a further learning duty in addition to said further difference when said further difference is larger than said predetermined value, and wherein said duty signal producing step further includes:

(e) changing said output duty forcibly, when said output duty is determined in accordance with said learning duty, until a rotational speed of said camshaft attains a predetermined value; and (f) storing said changed output duty as said further learning duty.

5. A method according to claim 4, wherein said steps (e) and (f) are performed only when said engine is in its idling condition.

* * * * *